R. E. WHEELER.
APPARATUS FOR PRESERVING FRUIT.
APPLICATION FILED JAN. 18, 1921.
1,408,915.
Patented Mar. 7, 1922.
2 SHEETS—SHEET 2.
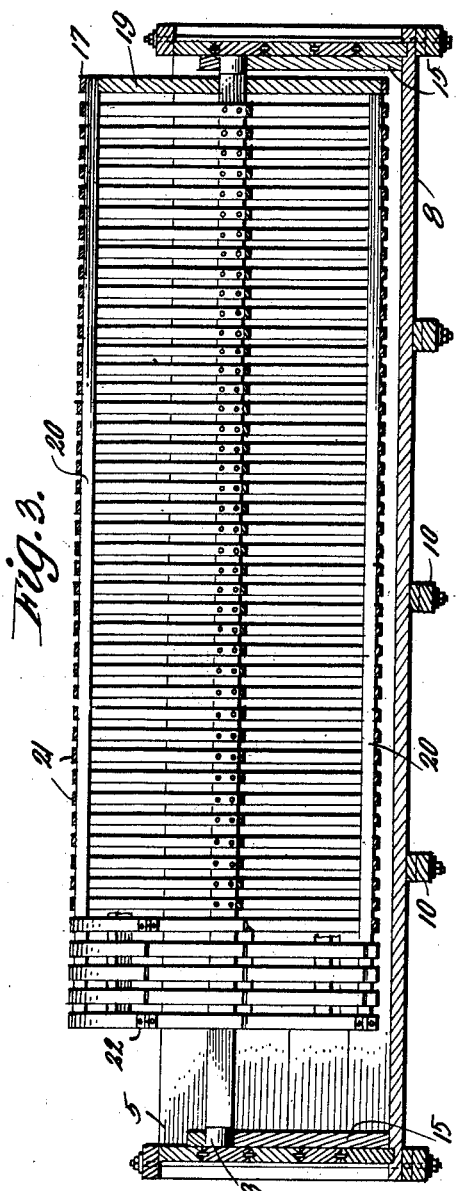
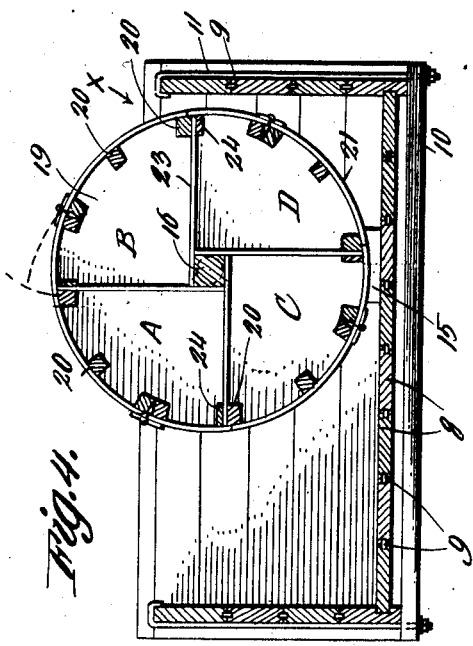
WITNESSES
ROY E. WHEELER
INVENTOR.
BY
ATTORNEY.

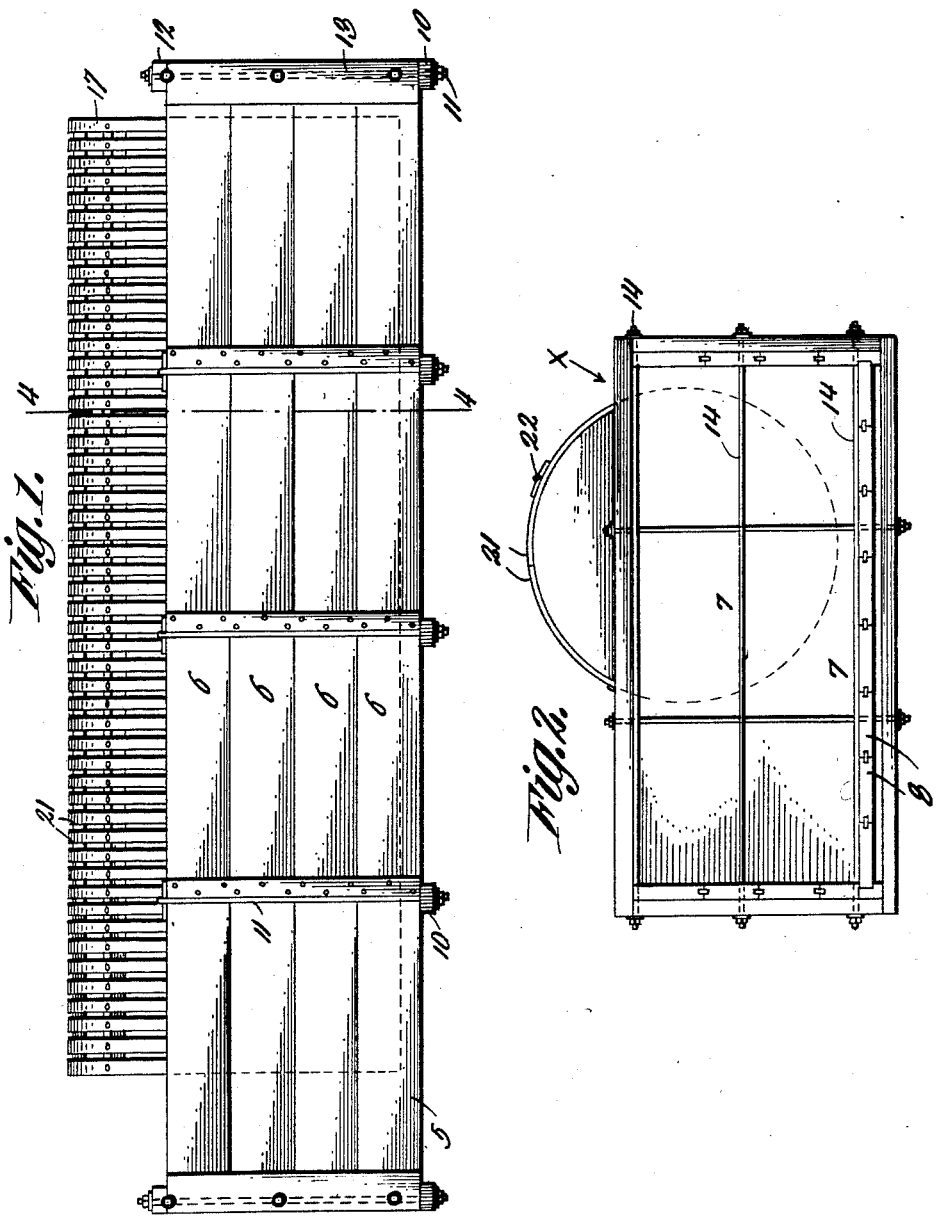

UNITED STATES PATENT OFFICE.

ROY E. WHEELER, OF PENN YAN, NEW YORK.

APPARATUS FOR PRESERVING FRUIT.

1,408,915. Specification of Letters Patent. Patented Mar. 7, 1922.

Application filed January 18, 1921. Serial No. 438,124.

*To all whom it may concern:*

Be it known that I, ROY E. WHEELER, a citizen of the United States, residing at Penn Yan, in the county of Yates and State of New York, have invented certain new and useful Improvements in an Apparatus for Preserving Fruit, of which the following is a specification.

The present invention relates to an apparatus and method for preserving fruit, and is especially designed to prepare quartered apples for canning.

It is known in this art that canned apples are frequently subject to premature decay due to the fact that the pores of the apples form habitats for air, which, acting in conjunction with the acid of the apple, causes the can to perforate, thereby starting deterioration of the apples or other fruit contained in cans. It is to overcome this objection that this apparatus and method have been devised.

A principal object of the invention is not only to expel the air from the pores of the quartered apples, but likewise to produce an apparatus which will permit handling of the apples in an expeditious manner to increase the output of a factory to a maximum.

The above and other objects of this invention will be more fully understood from the following description of the invention taken in connection with the accompanying drawings, wherein:

Fig. 1, is a side elevational view of a device constructed in accordance with this invention.

Fig. 2, is an end elevational view of the device.

Fig. 3, is a longitudinal sectional view of the device showing a portion of the cylinder in elevation, and Fig. 4, is a vertical sectional view taken on the line 4—4 of Fig. 1.

In the drawings, a tank 5 is provided which in this instance is shown to be of an oblong configuration and is made up of a plurality of side sections 6, and end sections 7. Said sides and ends are connected by a bottom which is made up of a plurality of sections 8. The sections of the sides, ends and bottom of the tank are secured together by means of water-tight connections 9, such, for instance, as white lead. As shown to advantage in Fig. 4, these connectors are completely housed within the sections. Moreover, the bottom of the tank has the lateral margins thereof mortised in the lower sections of the sides of the tank, while the ends of the tank are mortised in the upper faces of the sections comprising the bottom of the tank. In order to positively retain the side, end and bottom sections from relative movement, a suitable bracing structure is provided which consists especially of brace bars 10 which extend below the tank, transversely thereacross and slightly beyond the sides of the tank to receive brace rods 11, the upper terminals of which are bent over the upper margins of the sides of the tank. At the ends of the tank the brace bars 10 have rods 12 extended therethrough which extend through and above brace bars 12 mounted upon the top of the tank. The brace bars 10 and 12 at the ends of the tank are connected by side bars 13, all of which are held from lateral displacement by transversely extending tie rods 14. In this way a durable structure is provided which will be positively water-proof and which will positively withstand any reasonable pressure exerted thereon by movement of mechanism arranged therein.

The opposite ends of the tank 5 are equipped with bearing blocks 15 which bear against the inner faces of the ends of the tank and are provided with openings arranged near the tops of the blocks. These blocks are adapted for engagement with the ends of a shaft 16, the latter extending longitudinally through a cylinder 17 and connected thereto. As shown to advantage in Fig. 4, the shaft is square in cross-section, except at its ends, which, as indicated at 18, are circular and engage the openings formed in the upper ends of the bearing blocks 15. This formation permits the cylinder 18 to be rotated in the tank 5 for a purpose hereinafter set forth.

The cylinder is composed of heads 19, comprising the opposite ends thereof, said heads being connected by longitudinally extending ribs 20, the ends of which are countersunk in the peripheries of said heads. Circular slats 21 are secured to the ribs 20 and may be of sectional formation and any one or all of the sections hinged to the ribs as indicated at 22 and shown to advantage in Figs. 3 and 4. By hinging certain of the sections of the slats, or all of them, at the option of the user, access is gained to the interior of the cylinder. The hinges may, if desired, be of a spring type so as to normally hold the sections in a closed position. If desired, any suitable locking means may be provided for positively retaining the sections closed to prevent casual displacement of the contents of the cylinder. A plurality of slats 23 are secured to the shaft 16 and radiate therefrom into engagement with certain of the ribs 20 and are secured to the latter by means of binding strips 24. These slats are spaced and have the inner ends thereof fixedly secured to the sides of the shaft 16. By securing one series of the slats 23 to one face of the shaft 16 and another series of slats to another face of the shaft, so that said second series of slats will abut the inner terminals of the first series of slats, a plurality of offset compartments A, B, C and D will be provided.

In use of this device, water or other suitable liquid is placed in the tank 5 and may be heated in any desired manner to a predetermined temperature. After having reached this temperature, we will assume that the quartered apples are first placed in the compartment B, following which the cylinder is rotated so as to immerse the contents of said compartment B in the liquid contained in the tank. The compartment A, which is now in the position heretofore occupied by compartment B is filled with apples, following which the cylinder is again rotated, thereby immersing the contents of the tank A in the liquid contained in the tank. Since two of the compartments will at all times be immersed in the liquid, it will be apparent that both compartments A and B are now submerged. It is desired to retain the apples immersed in the water for a predetermined period of time which, in the present instance, we will assume to be twenty minutes. The contents of the compartment B, we will assume, was immersed in the liquid ten minutes during the filling of the compartment A. Consequently, after the compartment A has been submerged, the section C is brought into position to be filled, which, we will assume, takes ten minutes, thereby bringing the aggregate time which the contents of the compartment B has been held under the liquid to twenty minutes and the time which the contents of compartment A has been held in the liquid ten minutes. Consequently, when the compartment D is brought into position to be filled by again turning the cylinder, the contents of the compartment B are permitted to float out of the compartment, by merely opening the sections of the circular slats. The apples or other fruit contained in the compartment B will float therefrom into the tank 5, from whence they are removed and placed in cans. It will be observed, upon reference to Figs. 2 and 4 of the drawings, that the cylinder 17 is arranged adjacent one side of the tank 5 indicated by an arrow X, this side being known as the filling side. The cylinder is remote from the opposite side of the tank so as to permit ample space for the contents of the various compartments to successively float into the tank and be removed therefrom without in any way interfering with the operation of the cylinder.

It is of course to be understood that the device of this invention is susceptible of various other usages. However, the above is what I now deem to be the preferred method of using the device, especially in preparing apples for canning. The device is simple throughout, yet durable and efficient. The particular arrangement above described permits successive phases of operation necessary to properly prepare apples for canning and positively eliminates all lost motion, thereby at all times maintaining the output of the factory at a maximum. Various changes may be made in the device especially in the details of construction, proportion and arrangement of parts, without departing from the spirit and scope of the invention as covered by the appended claims.

What is claimed is:

1. An apparatus for preserving fruit including a liquid containing tank equipped with a cylinder divided into compartments, certain of said compartments being submerged in the liquid, while other of the compartments are open above the surface of the water to permit filling of the cylinder on one side and removal of the contents thereof from the opposite side.

2. An apparatus for preserving fruit including a liquid containing tank, and a cylinder revolubly mounted in the tank and divided into compartments for the reception of fruit adapted to be successively immersed in said liquid, said compartments being decentered to off-set the same for facilitating filling and emptying the compartments.

3. An apparatus for preserving fruit including a liquid containing tank equipped with a multi-parted cylinder said cylinder being perforate to permit passage of the liquid therethrough when the cylinder is revolved in the tank to immerse the contents of each part of the cylinder, each of said parts being equipped with hinged sections to permit access thereto.

4. An apparatus of the class described including a liquid containing tank equipped with a revoluble cylinder, said cylinder being divided into compartments which are off-set, whereby one compartment is appreciably above the plane of one of the others when the partition dividing any two of the compartments is on a line parallel with the longitudinal axis of the tank to hold the contents of the upper compartment slightly above the surface of the liquid in the tank and the contents of the lower of said compartments slightly beneath the surface of the liquid in the tank, and hinged sections closing each of said compartments to permit access to be gained thereinto.

5. A device as specified including a liquid containing tank, a cylinder revolubly mounted in said tank in close proximity to one side and one end thereof and remote from the opposite side and opposite end of the tank, said cylinder adapted to receive fruit to be immersed in said liquid by the rotation of the cylinder and being removable therefrom automatically, by the liquid, into the tank, in the space provided between the spaced end and side of the tank and periphery of the cylinder.

In testimony whereof I affix my signature in presence of two witnesses.

ROY E. WHEELER.

Witnesses:
F. C. WHITAKER,
BERT SWICK.